United States Patent
Shiratori et al.

(10) Patent No.: US 8,240,738 B2
(45) Date of Patent: Aug. 14, 2012

(54) VEHICLE SWITCH ARRANGEMENT STRUCTURE

(75) Inventors: Kenichi Shiratori, Saitama (JP); Tomohiko Yashiro, Saitama (JP); Sho Yamamoto, Saitama (JP); Masahiro Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 321 days.

(21) Appl. No.: 12/636,039

(22) Filed: Dec. 11, 2009

(65) Prior Publication Data
US 2010/0194136 A1    Aug. 5, 2010

(30) Foreign Application Priority Data

Feb. 4, 2009  (JP) ................................ 2009-023989
Feb. 10, 2009 (JP) ................................ 2009-028464

(51) Int. Cl.
*B62D 25/14* (2006.01)
(52) U.S. Cl. .......................... 296/70; 180/90; 200/61.54
(58) Field of Classification Search .................... 296/70; 180/78, 90; 200/61.54
See application file for complete search history.

(56) References Cited

U.S. PATENT DOCUMENTS

| | | | | |
|---|---|---|---|---|
| 3,857,454 A * | 12/1974 | Kobayashi et al. | ............. | 180/78 |
| 4,423,297 A * | 12/1983 | Berginski | ................... | 200/61.54 |
| 4,571,786 A * | 2/1986 | Osujo | ............................. | 74/485 |
| 4,649,768 A * | 3/1987 | Kusaka et al. | ............... | 74/484 R |
| 4,966,044 A * | 10/1990 | Bowman et al. | ................ | 74/335 |
| 5,099,720 A * | 3/1992 | Raue | ............................. | 477/144 |
| 5,156,243 A * | 10/1992 | Aoki et al. | ..................... | 192/218 |
| 5,514,048 A * | 5/1996 | Jacobson et al. | ................ | 477/99 |
| 5,780,796 A * | 7/1998 | Uchiyama et al. | ......... | 200/61.54 |
| 5,802,924 A * | 9/1998 | Johnson et al. | ............. | 74/484 R |
| 5,865,705 A * | 2/1999 | Shamoto et al. | ................ | 477/79 |
| 6,452,337 B1 * | 9/2002 | Murata | .......................... | 315/82 |
| 2004/0189446 A1 * | 9/2004 | Fournier | .................... | 340/425.5 |
| 2006/0180378 A1 * | 8/2006 | Nordin | .......................... | 180/272 |
| 2008/0045381 A1 * | 2/2008 | Vermeersch et al. | ........... | 477/99 |
| 2009/0174533 A1 * | 7/2009 | Bowden et al. | ............. | 340/425.5 |
| 2009/0309338 A1 * | 12/2009 | Hillman | ..................... | 280/728.3 |
| 2010/0070932 A1 * | 3/2010 | Hur | ................................. | 715/863 |
| 2010/0187847 A1 * | 7/2010 | Jones et al. | ................... | 296/1.08 |

FOREIGN PATENT DOCUMENTS

JP    2003-34163 A    2/2003
JP    4130368 B2      5/2008

* cited by examiner

*Primary Examiner* — Lori Lyjak
(74) *Attorney, Agent, or Firm* — Birch, Stewart, Kolasch & Birch, LLP

(57) ABSTRACT

A switch box includes an optical-axis-changeover switch for headlamps, an on/off-changeover switch for the headlamps and a starter switch arranged on the same operation board. A main switch can turn on and off a main electric source of an MUV 1 in cooperation with a portable key. The switch box and the main switch are arranged on the instrument panel. The switch box is partially or fully disposed in a projective area of the steering wheel in a driver's eyesight. The starter switch is made to be of a push-type, whereas the optical-axis-changeover switch and the on/off-changeover switch for the headlamps are made to be of a seesaw-type. A segment display of a meter device includes a unit indication member for switchably indicating kilometer indication and mile indication by displaying only an arbitrary display element of a plurality of display elements arranged adjacently to each other in a horizontal direction.

20 Claims, 9 Drawing Sheets

VEHICLE SWITCH ARRANGEMENT STRUCTURE

CROSS-REFERENCE TO RELATED APPLICATIONS

The present application claims priority under 35 USC 119 to Japanese Patent Application No. 2009-023989 filed on Feb. 4, 2009 and Japanese Patent Application No. 2009-028464 filed on Feb. 10, 2009 the entire contents of which are hereby incorporated by reference.

BACKGROUND OF THE INVENTION

1. Field of the Invention

The present invention relates generally to a vehicle switch arrangement structure and in particular to an arrangement structure of vehicle switches attached to a vehicle body panel in front of a steering wheel to operate lamps, a drive source, etc. In addition, the present invention relates generally to vehicle meter devices and more particularly to a vehicle meter device that uses a segment display to indicate vehicle speed, travel distance, etc.

2. Description of Background Art

Vehicles are known that include a steering wheel configured such that various switches such as a main switch, used to turn on/off a main electric source of the vehicle, and a starter switch, used to drive a starter motor and the like, are attached to a vehicle body panel in front of the steering wheel.

Japanese Patent No. 4,130,368 discloses a vehicle switch arrangement structure for a vehicle in which a steering wheel post covering a steering shaft of a steering wheel and an instrument panel on which the handlebar post is provided to project upright constitute a vehicle body panel in front of a driver's seat. In this arrangement structure, a starter switch, used to start an engine, and a slit, used to receive a portable key inserted thereinto and enable the operation of the starter switch, that is, a main switch used to switch turning-on and -off a main electric source of the vehicle are collectively arranged on the instrument panel.

In addition, there are often provided switches for lamps as vehicle switches. In the vehicle switch arrangement structure described in Japanese Patent No. 4,130,368, lamp switches are collectively arranged on the vehicle body panel in addition to the starter switch and the main switch. In this case, however, the arrangement relationship among the switches is especially not considered with respect to usability for the increased switches.

In addition, a vehicle meter is known for indicating the vehicle speed and travel distance by means of a segment display which combines lighting with extinction in a plurality of predetermined display ranges to produce a predetermined indication.

Japanese Patent Laid-open No. 2003-34163 discloses a vehicle meter device in which segments indicating "km/h" and segments indicating "mph" are arranged one above the other right next to a vehicle speed indication composed of a seven-segmented liquid crystal display. On the other hand, segments indicating "km" and segments indicating "miles" are arranged one above the other right next to a travel distance indication. This meter device is configured to indicate only "km" and "km/h" for kilometer indication and only "miles" and "mph" for mile indication, depending on the destination of the vehicle.

However, the vehicle meter device described in Japanese Patent Laid-open No. 2003-34163 has a problem in that a screen of the meter device is likely to be enlarged due to the necessity of providing both respective units corresponding to the kilometer indication and mile indication on the segment display. The position of the unit indication moves up and down along with switching of the unit indications. Therefore, the positional relationship between numerical characters and the unit largely changes so that a viewer may probably feel a sense of discomfort.

SUMMARY AND OBJECTS OF THE INVENTION

It is an object of an embodiment of the present invention to solve the problems regarding the related art described above and to provide a vehicle switch arrangement structure adapted to improve the usability of switches such as a main switch, a starter switch and lamp switches by devising the arrangement structure.

To achieve the above object according to an embodiment of the present invention a vehicle switch arrangement structure applied to a vehicle includes a vehicle body panel, the vehicle body panel being composed of a steering wheel column covering a steering shaft of a steering wheel and an instrument panel on which the steering wheel column is installed to be erected therefrom and in which a starter switch is adapted to start an engine by being operated when a main electric source of the vehicle is turned on. A main switch is adapted to changeover on/off of the main electric source of the vehicle in cooperation with a portable key, the vehicle switch arrangement structure includes at least one lamp switch adapted to switch an operating state of a lamp; and a switch box having an operation board and the lamp switch and the starter switch arranged on the operation board. The switch box is independent of the main switch and is disposed on the vehicle body panel in the vicinity of the main switch.

According to an embodiment of the present invention, the switch box and the main switch are arranged on the instrument panel.

According to an embodiment of the present invention, the switch box is disposed to partially or fully fit in a projective area of the steering wheel in a driver's eyesight.

According to an embodiment of the present invention, the lamp switch and the starter switch are shaped differently from each other.

According to an embodiment of the present invention, the starter switch is composed of a push-type switch, and the lamp switch is composed of a plurality of seesaw-type switches which are arranged adjacently from each other to have respective longitudinal sides opposed to each other.

According to an embodiment of the present invention, the lamp switch is composed of a headlamp optical-axis-changeover switch and a headlamp on/off-changeover switch, and an erecting member is provided to surround one of the headlamp optical-axis-changeover switch and the headlamp on/off-changeover switch According to an embodiment of the present invention, the switch box is configured such that the starter switch is disposed below the headlamp switch, and the main switch is disposed adjacently to and below the switch box.

According to an embodiment of the present invention, a fluorescent coating is applied to the lamp switch and the starter switch.

According to an embodiment of the present invention, the vehicle switch arrangement structure includes at least one lamp switch adapted to switch an operating state of a lamp. The switch box includes the operation board and the lamp switch and the starter switch arranged on the operation board. The switch box is independent of the main switch and is disposed on the vehicle body panel in the vicinity of the main switch. Therefore, the various switches can collectively be arranged on the vehicle body panel to simplify a wiring structure and also to achieve a space-saving. Further, even if the various switches are collectively arranged on the vehicle body switch, it becomes easy to differentiate especially the main switch operated first to drive, from the other switches arranged on the switch box, which can enhance the operability.

According to an embodiment of the present invention, since the switch box and the main switch are arranged on the instrument panel, the operating portion of the steering wheel and the operating portions of the switches are spaced apart from each other. Therefore, a fingertip can be prevented from coming into contact with the switch box and the main switch. Further, since all the switches are arranged on the instrument panel, the wiring structure can be simplified.

According to an embodiment of the present invention, the switch box is disposed to partially or fully fit in a projective area of the steering wheel in a driver's eyesight. Therefore, when the driver sees the steering wheel, an area of the switch box can be reduced that is seen projectingly from the outside of the outer circumferential edge portion thereof. Thus, a simple external appearance can be obtained. In addition, the switches can be disposed at the respective positions not easily touched by a passenger other than the driver.

According to an embodiment of the present invention, since the lamp switch and the starter switch are shaped differently from each other, both can easily be differentiated from each other based on visual sensation and tactile sensation. Therefore, even if the driver cannot view both the switches because they are located in front of the steering wheel, both the switches can be differentiated from each other by being touched with a hand.

According to an embodiment of the present invention, since the starter switch is composed of a push-type switch and the lamp switch is composed of a seesaw-type switch, both the switches are different from each other not only in shape but also in the operational method, whereby it becomes easier to differentiate both the switches from each other. In addition, since the plurality of lamp switches are arranged such that their longitudinal sides are opposed to each other, the arrangement space of the lamp switches can be reduced.

According to an embodiment of the present invention, the lamp switch is composed of a headlamp optical-axis-changeover switch and a headlamp on/off-changeover switch, and the erecting member is provided to surround one of the headlamp optical-axis-changeover switch and the headlamp on/off-changeover switch. Therefore, even if the two lamp switches have the same shape, both can be differentiated from each other based on a fingertip's tactile sensation. Even if the vehicle body sways at the time when operating the switch, the possibility that both the switches are pressed simultaneously can be reduced by being blocked by the erecting member 81.

According to an embodiment of the present invention, the switch box is configured such that the starter switch is disposed below the headlamp switch, and the main switch is disposed adjacently to and below the switch box. Thus, since the main switch and the starter switch are arranged adjacently to each other, the engine can quickly be started after the main switch is operated. It is possible, for example, to prevent the erroneous insertion of a portable key into a portion of the starter switch compared with the case where the main switch and the starter switch are arranged vehicle-widthwise. Further, since the main switch is disposed below the switch box, even if a key holder or the like is attached to the portable key, it can be prevented from interfering with the starter switch or the like.

According to an embodiment of the present invention, since the fluorescent coating is applied to the lamp switch and the starter switch, the visibility and operability of the switch box during the hours of darkness can be enhanced without the use of electric power.

It is an object of an embodiment of the present invention to solve the problem of the conventional art described above and to provide a vehicle meter device that can reduce the area of a unit indication by a segment display while allowing a viewer not to feel a sense of discomfort.

To achieve the above object, according to an embodiment of the present invention, a vehicle meter device is provided that includes unit indication means including, a plurality of display elements each producing a display in a predetermined range, and display control means for switchably displaying one of or the other of units by displaying only an arbitrary display element of the plurality of display elements, wherein the plurality of display elements are arranged adjacently to each other in a horizontal direction, and the unit indication means includes at least one common display element repeatedly displayed even if any of the one of or the other of units is displayed.

According to an embodiment of the present invention, a speed-unit indication means is disposed on the right of the numerical indication to indicate the speed-unit. The vehicle meter device includes input means for performing selection between a kilometer indication and a mile indication. The speed-unit indication means includes a first display element visually recognized in a shape of a "k," a second indication means disposed right next to the first display element and visually recognized as a shape of a "m," a third display element disposed right next to the second indication element and visually recognized as a shape of a straight line, a fourth display element disposed right next to the third display element and visually recognized as a shape of a circular arc, and a fifth display element disposed right next to the fourth display element and visually recognized as a shape of a "h," the third display element and the fourth display element are arranged to be visually recognized as a shape of a "p" when both are displayed simultaneously, and, the display control section is configured to display the first display element, the second display element, the third display element and the fifth display element when the kilometer indication is selected based on a selection signal from the input means and to display the second display element, the third display element and the fourth display element and the fifth display element when the mile indication is selected.

According to an embodiment of the present invention, the unit indication means is distance-unit indication means is disposed on the right of numeral indication to indicate distance-unit. The meter device includes input means for performing a selection between a kilometer indication and a mile indication, the distance-unit indication means includes a first display element visually recognized as a shape of a "k," a second display element disposed right next to the first display element and visually recognized as a shape of a "m," a third display element disposed right next to the second display element and visually recognized as a shape of an "i," a fourth display element disposed right next to the third display element and visually recognized as a shape of a "l," and a fifth display element disposed right next to the fourth display element and visually recognized as a shape of an "e," and the display control section is configured to display the first display element and the second display element when the kilometer indication is selected based on a selection signal from the input means and to display the second display element, the third display element and the fourth display element and the fifth display element when the mile indication is selected.

According to an embodiment of the present invention, the time-unit indication means is disposed above or below the distance-unit indication means and visually recognized as a shape of a "h," and the display control means is configured to switchably display the distance-unit indication means and the time-unit indication means.

According to an embodiment of the present invention, the plurality of display elements is arranged adjacently to each other in a horizontal direction, and the unit indication means includes at least one common display element repeatedly displayed even if any of the one of or the other of units is displayed. Therefore, the two units can switchably be displayed in a small occupancy area so that the meter device can be reduced in size and simplified in structure.

According to an embodiment of the present invention, the display elements, five in total, are arranged in a horizontal row, which can switchably display a kilometer indication "km/h" and a mile indication "mph" as the speed indication. Thus, the occupancy area of the speed unit indication means can be reduced, whereby the meter device can be reduced in size and simplified in structure. Further, the unit can be switched at the same height as the numeral indication and at a position close to the numeral indication. Thus, a variation in the positional relationship between numeral and unit can be reduced.

According to an embodiment of the present invention, the display elements, five in total, are arranged in a horizontal row, which can switchably display a kilometer indication "km" and a mile indication "mile" as a distance indication. Thus, the occupancy area of the distance unit indication means can be reduced, whereby the meter device can be reduced in size and simplified in structure. Further, the unit can be switched at the same height as the numeral indication and at a position close to the numeral indication. Thus, a variation in the positional relationship between the numeral and unit can be reduced.

According to an embodiment of the present invention, the time unit indication means visually recognized as a shape of a "h" is disposed above or below the distance unit indication means. In addition, the display control means is configured to switchably display the distance-unit indication means and the time-unit indication means. Thus, it is possible to switchably display a distance meter and time indication such as a timer, a stopwatch and others by sharing the numerical indication part of a seven-segment type. In addition, since the distance-unit indication means and time-unit indication means are different from each other in a heightwise-position, it becomes easy to recognize the variation of the indication content.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
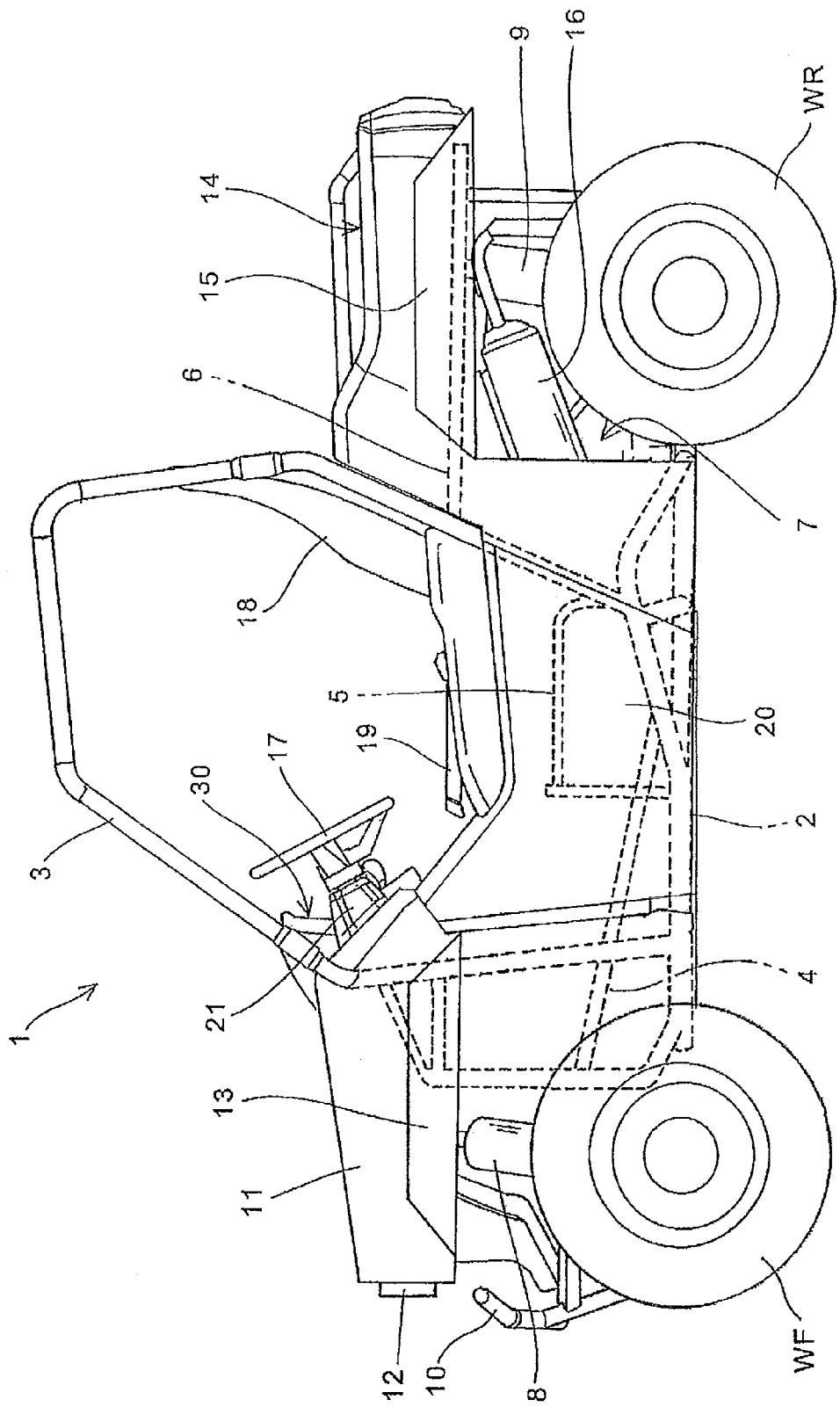
FIG. 1 is a lateral view of a four-wheeled vehicle (MUV) to which a vehicle switch arrangement structure according to an embodiment of the present invention is applied.
Figure 2:
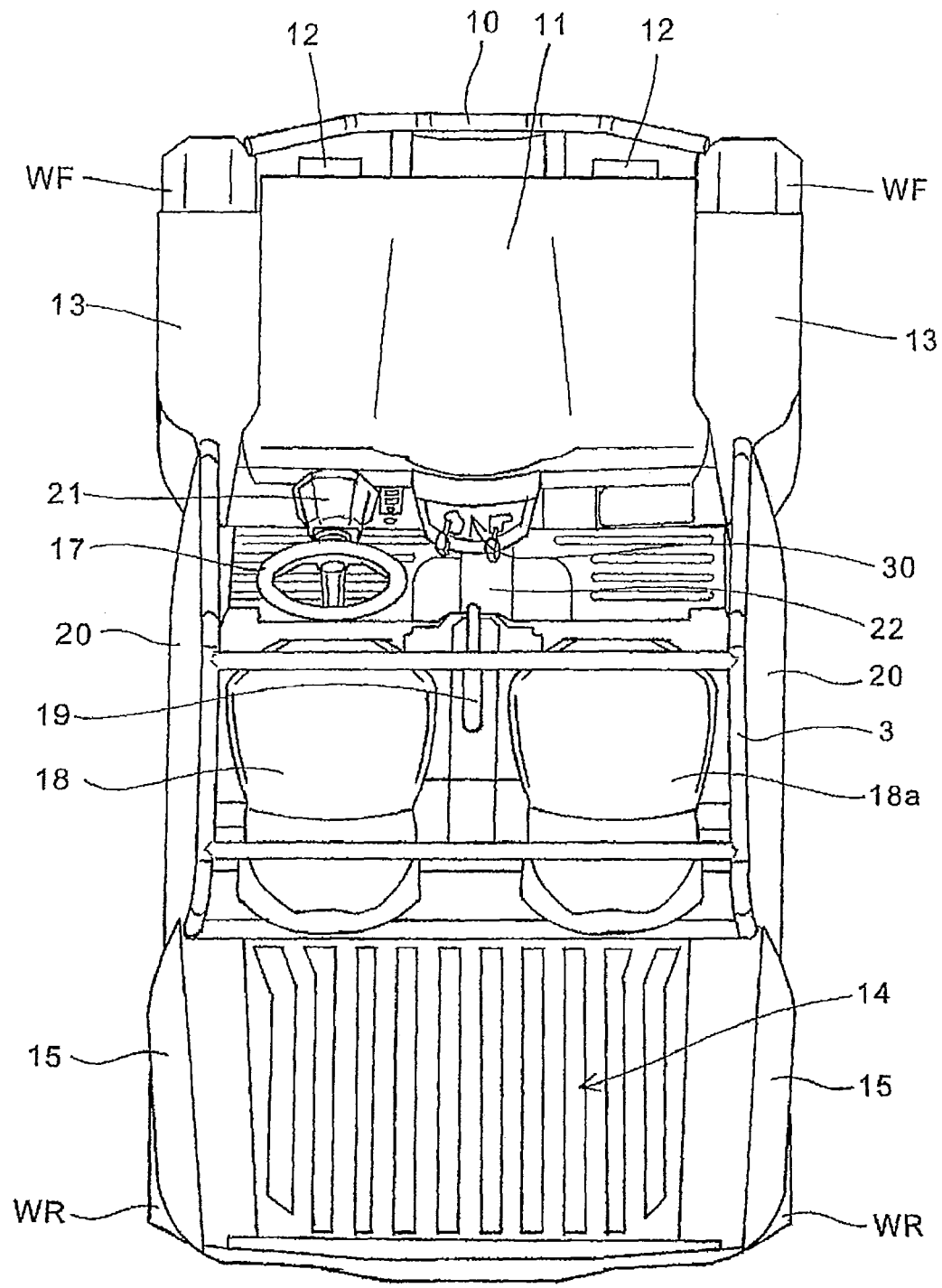
FIG. 2 is a plan view of the MUV.

Preferred embodiments of the present invention will hereinafter be described in detail with reference to the drawings. FIG. 1 is a lateral view of a four-wheeled vehicle 1 to which a vehicle switch arrangement structure according to an embodiment of the present invention is applied. FIG. 2 is a plan view of the four-wheeled vehicle 1. The four-wheeled vehicle is a two-passenger multi-purpose four-wheeled vehicle (MUV: multi-utility vehicle) having a cabin unshielded from the outside. The four-wheeled vehicle 1 described below may be referred to as the MUV 1.

A chassis 2 of the MUV 1 is configured by assembling a plurality of steel pipes. An engine 7 equipped integrally with an automatic transmission is mounted to the chassis 2 on the rear side of the vehicle body. A pair of left and right front wheels WF and a pair of left and right front wheels WR are supported by respective suspension arms not illustrated and by the chassis 2 via a front wheel shock absorber 8 and a rear wheel shock absorber 9, respectively. The MUV 1 is a four-wheel-drive vehicle. The drive force of the engine 7 is transmitted not only to the rear wheels WR but also to a differential gear of the front wheels WF via a propeller shaft (see FIG. 3) 36 disposed in the back and forth direction of the vehicle body. A muffler 16 is disposed on the vehicle body left side of the engine 7.

A seat frame 5 is joined to the chassis 2 to support a driver's seat 18 and a passenger's seat 18a. A rear frame 6 for supporting a rear deck 14 is joined to the chassis 2 at a position upward and rearward of the seat frame 5. A reinforcing fame 4 extending forward upwardly toward the front of the vehicle body is provided at the vehicle widthwise center of the chassis 2. The reinforcing frame 4 is joined to a horizontal chassis member and to a vertical chassis member to constitute a brace, thereby increasing the strength of the chassis 2. A roll-over bar 3 is joined to the upper portion of the chassis 2 to ensure an occupant's sitting space. A bumper 10 is joined to a vehicle body front end portion of the chassis 2.

A front cover 11 attached with a pair of left and right headlamps 12 is disposed rearward and upward of the bumper 10. Front fenders 13 are installed on the vehicle widthwise left and right of the front cover 11 so as to cover from above the front wheels WF as steering wheels. Rear fenders 15 are installed on the vehicle widthwise left and right and above the rear wheels WR.

A vehicle body panel composed of an instrument panel 30 and a steering wheel column 21 is installed on the vehicle body front side of the driver's seat and passenger's seat 18a. Meters and gauges, an operating lever and the like are disposed at the vehicle widthwise center of the instrument panel 30. The steering wheel column 21 covering a steering shaft (not illustrated) of the steering wheel 17 is installed on the vehicle widthwise left of the instrument panel 30 so as to be erect toward the driver side. A parking brake lever 19 is disposed between the driver's seat 18 and the passenger's seat 18a. A floor panel 22 is formed forward of and below the parking brake lever 19 so as to cover the reinforcing pipe 4, a propeller shaft, etc. Doors 20 are each installed on the vehicle widthwise outside of each of the driver's seat 18 and the passenger's seat 18a so as to pivot around the vehicle body front side.

Figure 3:
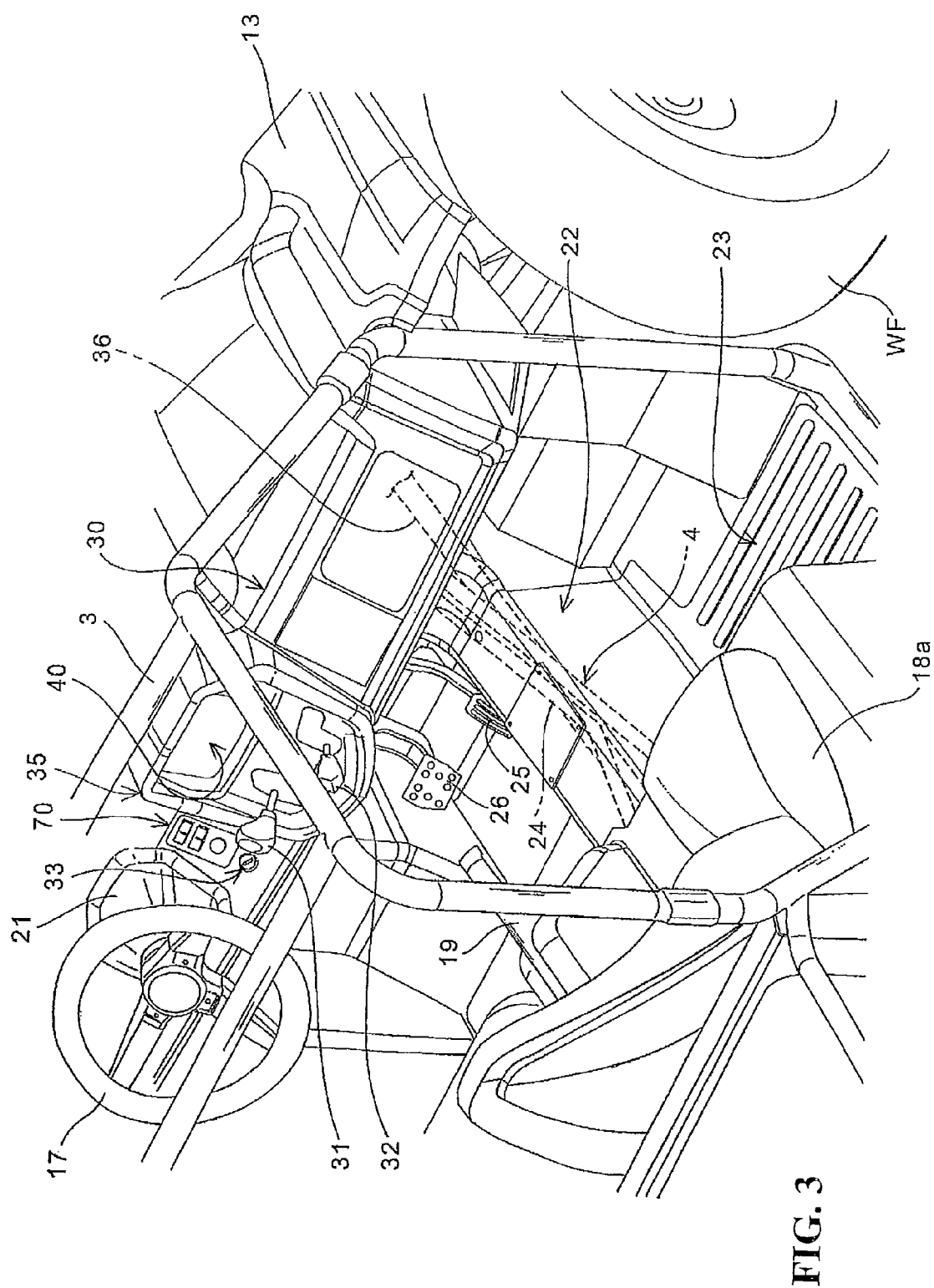
FIG. 3 is a partially enlarged perspective view of the MUV.

FIG. 3 is a partially enlarged perspective view of the MUV 1. The same reference numerals as described above denote like and corresponding portions. An occupant's foot rest floor 23 is formed on each of the vehicle widthwise left and right of a floor tunnel 22. The floor tunnel 22 is shaped to protrude upright from the foot rest floors 23. The propeller shaft 36 extending generally horizontally, the reinforcing frame 4 slanting rearward and downward toward the rear of the vehicle body, and a harness 24 extending along the reinforcing frame 4 are disposed inside the floor tunnel 22. An accelerator pedal 25 and a brake pedal 26 are provided above the foot rest floor 23 on the side of the driver's seat 18.

A meter device 40 equipped with a speed meter, a distance meter and the like and a projecting portion 35 provided with two levers used to operate a drive force transmission device are formed at the vehicle widthwise general center of the instrument panel 30 disposed to face the driver's seat 18 and the passenger's seat 18a. The shift lever 31 on the vehicle widthwise left side is an operating lever operative to switch transmission's operating conditions including drive (D), reverse (R), neutral (N) and parking (P). A differential locking lever 32 rightward adjacent to the shift lever 31 is an operating lever operative to switch between locking and unlocking of the differential gear for the front and rear wheels.

The steering wheel column 21 supporting the steering wheel 17 is provided on the vehicle widthwise left of the projecting portion 35 so as to extend toward the rear of the vehicle body. A switch box 70 and a main switch 33 are arranged one above the other between the steering wheel column 21 and the projecting portion 35. The switch box 70 includes a light switch used to switch the operating conditions of the headlamps 12 and a starter switch used to start the engine. The main switch 33 cooperates with a portable key to switch between the turning-on and -off of a main electric source.

Figure 4:
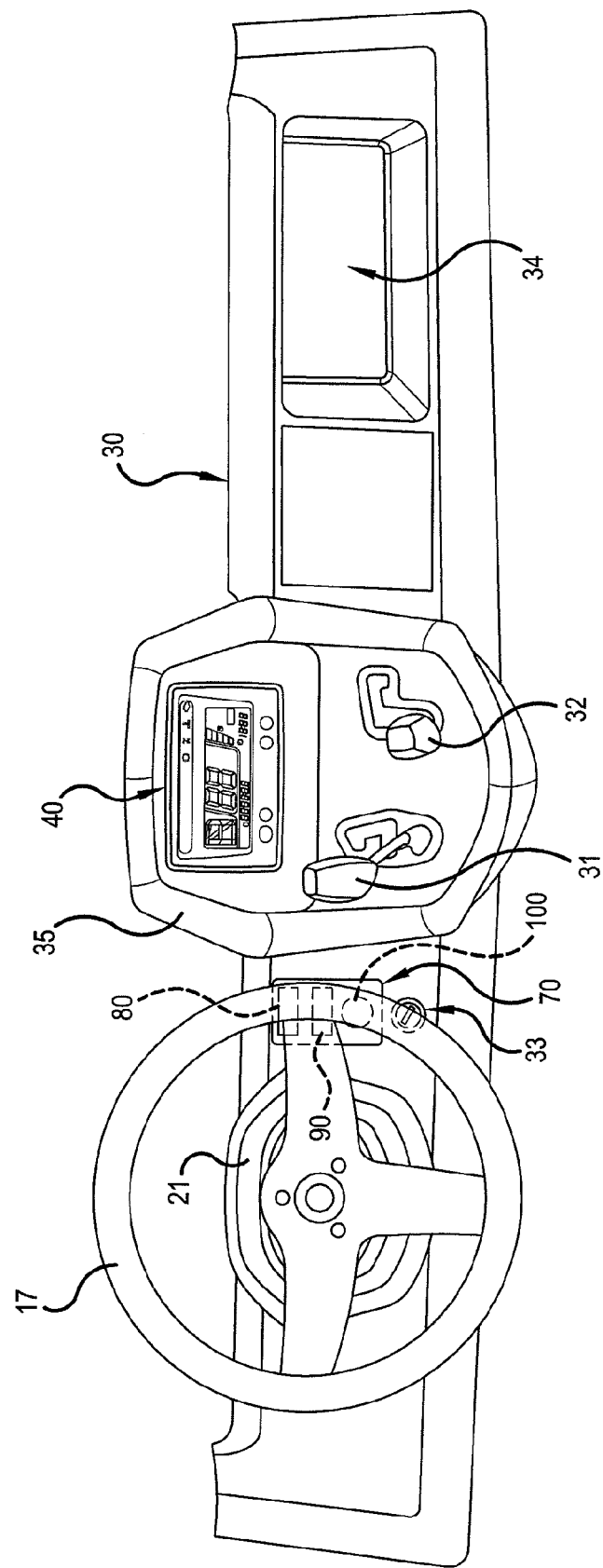
FIG. 4 is a front view of an instrument panel.

FIG. 4 is a front view of the instrument panel 30. The same reference numerals as described above denote like and corresponding portions. This view corresponds to a state visually recognized by a driver, in which the steering wheel 17 has a turning surface disposed at such an angle so as to be generally directly opposed to the driver. The projecting portion 35 provided with the meter device 40 projects not only toward the rearward of the vehicle body but largely toward the upside of the vehicle body. The meter device 40 disposed at an upper portion of the projecting portion 35 is provided with the speed meter, the distance meter, an fuel indicator, a gear position display and various warning lamps. The shift lever 31 and the differential locking lever 32 are disposed below the meter device 40. A change box space 34 is disposed on the right side of the instrument panel 30.

The steering wheel 17 is circular as viewed from front and is turnably supported by the rear end portion of the steering wheel column 21 shaped to be increasingly reduced in an outer diameter as it goes toward the rear of the vehicle body. The switch box 70 and the main switch 33 are arranged one above the other in a space between the steering wheel column 21 and the projecting portion 35 with the main switch 33 disposed on the lower side.

Starting from up, an on/off-changeover switch 80 of the headlamps 12, an optical-axis-changeover switch 90 of the headlamps 12 and a starter switch 100 are arranged on the switch box 70. The on/off-changeover switch 80 is composed of a seesaw-type switch that is rectangular as viewed from the front. The optical-axis-changeover switch 90 is composed of a seesaw-type switch rectangular as viewed from the front. The starter switch 100 is composed of a push-type switch circular as viewed from the front. The main switch 33 is a cylindrical key cylinder operatively turned by inserting a portable key and only its operational end face is disposed to face the passenger side. In addition, the main switch may be one needed only to cooperate with a portable key to turn on and off the main electric source of the vehicle. For example, the main switch may be composed of a portable wireless key incorporating a transponder, a slit adapted to receive the portable wireless key inserted thereinto for ID authentication, and the like.

In the present embodiment, since the lamp switches 80, 90 and the starter switch 100 are housed in the switch box 70, even if all the switches are attached to the vehicle body panel, it is easy to differentiate the main switch 33 operated first to drive, from the other switches, which can enhance operability. In addition, since the switch box 70 and the main switch 33 are arranged on the instrument panel 30, the switches are collectively arranged in the vicinity of the steering wheel 17, which can enhance the operability of the switches. Further, the operative portion (the wheel portion) of the steering wheel 17 and the operative portion of the switches are spaced apart from each other. Therefore, it is possible to prevent a fingertip or the like from coming into contact with the switch box 70 and the main switch 33 during operation of the steering wheel 17.

The switch box 70 is disposed to partially or fully fit in a projective area of the steering wheel 17 in the driver's eyesight. In other words, the switch box 70 is disposed to partially or fully fit in the inside of the outer diameter edge portion of the steering wheel 17 as viewed from the front of the steering wheel. In the present embodiment, as illustrated in the figure, the switch box 70 is disposed so that its large portion fits in the projective area of the steering wheel 17. Therefore, when the driver sees the steering wheel 17, the switch box 70 can be reduced in the area that is seen as if it projects from the outside of the outer circumferential edge portion hereof. Thus, a simple external appearance can be obtained. In addition, the switches can be arranged by effectively using the space in front of the steering wheel 17. Further, the switches can be arranged at positions not easily touched by the passenger other than the driver.

Further, the main switch 33 is disposed below the switch box 70 so that not only the switch box 70 but also the main switch 33 is disposed so as to fit in the inside of the steering wheel 17. Thus, simpler external appearance can be obtained. In addition, in accordance with the arrangement of the main switch 33 as described above, even if a key holder or the like is attached to the portable key, the possibility can be reduced that the key holder comes into contact with the lamp switch or the like during travelling.

The arrangement structure of the switch box 70 and the main switch 33 is not limited to the embodiment described above but can be modified in various ways. For example, both the switch box 70 and the main switch 33 are disposed so as to fully fit in the inside of the outer diameter edge portion of the steering wheel 17. Alternatively, the switch box 70 and the main switch 33 may be installed on the instrument panel 30 on the left side of the steering wheel column 21. Further, the main switch 33 can be installed on the lateral surface portion of the steering wheel column 21.

Figure 5:
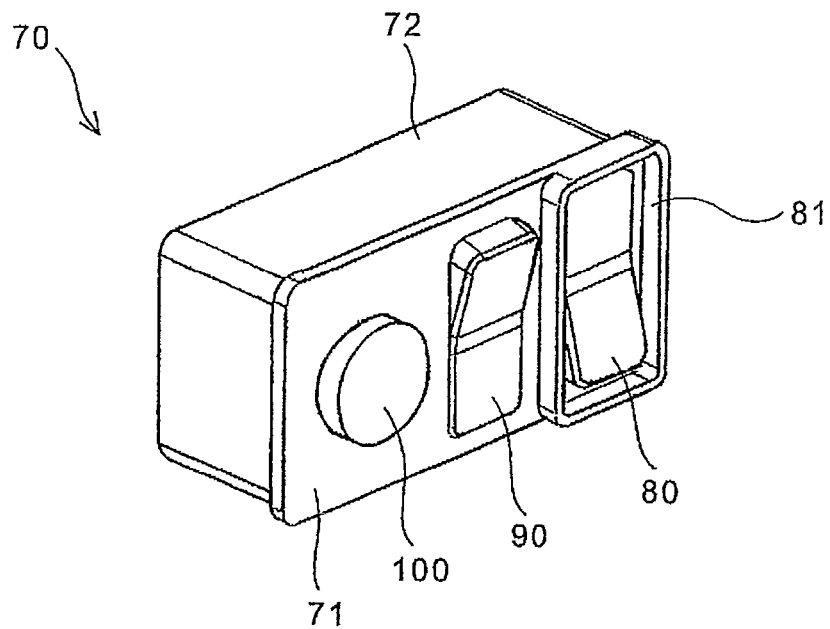
FIG. 5 is a perspective view of a switch box.

FIG. 5 is a perspective view of the switch box 70. The same reference numerals as described above denote like or corresponding portions. The figure illustrates the switch box 70 turned 90 degrees clockwise with respect to the direction of attachment to the vehicle body as viewed from the front. The switch box 70 is configured such that the switches are housed in a housing space defined by a box-like housing 72 and an operation board 71 and only operation elements of the switches are made to project outwardly from corresponding through-holes formed in the operational board 71.

In the present embodiment, the headlamp optical-axis-changeover switch 80 and the headlamp on/off-changeover switch 90 are each composed of a rectangular seesaw-type switch pressed with a fingertip shifted vehicle-widthwise. On the other hand, the starter switch 100 is composed of a circular push-type switch. In this way, both are made different from each other in shape and in operational method. Thus, even if the switch box 70 cannot be viewed during traveling, both can easily be differentiated from each other based on the tactile sensation of a fingertip to allow for proper operation. The headlamp optical-axis-changeover switch 80 and the headlamp on/off-changeover switch 90 are adjacently arranged one above the other such that their longitudinal sides are opposed to each other. This reduces the arrangement space for the lamp switches. In addition, since the plurality of switches are collected in the switch box 70, the arrangement of the wiring cords of the switches can be simplified.

In the present embodiment, an erecting member 81 erecting toward the rear of the vehicle body is provided to surround the headlamp optical-axis-changeover switch 80. Thus, for example, even if the headlamp optical-axis-changeover switch 80 and the headlamp on/off-changeover switch 90 are made to have the same shape, both can be differentiated from each other based on the tactile sensation of a fingertip. In addition, even if the vehicle body sways at the time of operating the switch, the possibility that both the switches may be pressed simultaneously can be reduced by being blocked by the erecting member 81.

The shapes of the operating elements of the switches can be modified in various ways. For example, the operating elements can each be provided on the surface with a letter or character or a drawing pattern indicating its function or formed with asperities for antislip. In addition, the operating elements of the switches may be configured to be visually differentiated from each other even during the hours of darkness without use of electric power by application of a fluorescent coating.

Figure 6:
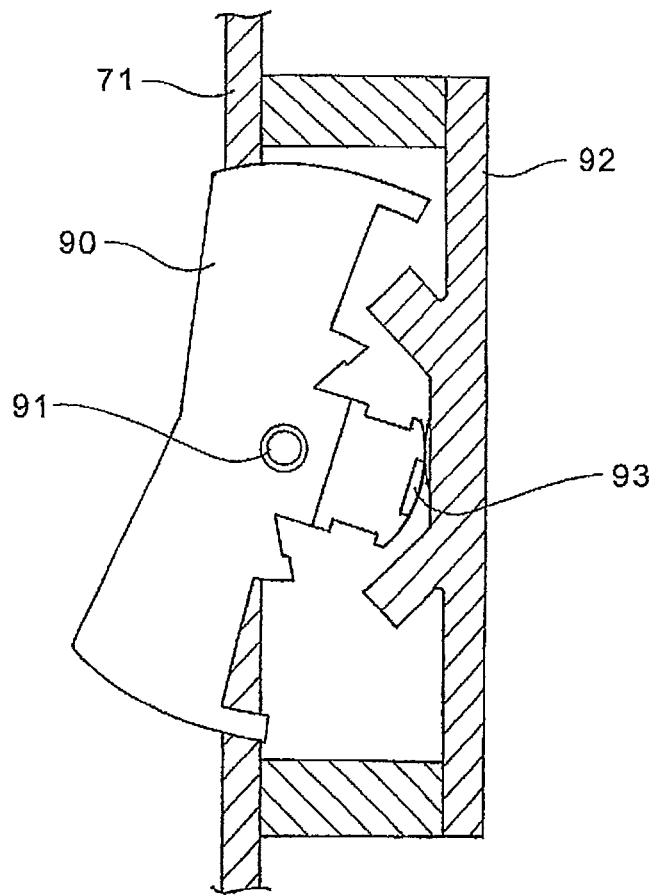
FIG. 6 is a cross-sectional view illustrating a structure of an on/off changeover switch of a headlamp.

FIG. 6 is a cross-sectional view illustrating a configuration of the headlamp on/off-changeover switch 90. The headlamp on/off-changeover switch 90 is configured to swing around a turning shaft 91 of a holding case 92 secured to the operation board 71. A contact 93 provided on the back side of the operating element is switched between connection counterparts by the swinging movement of the operating element so that on/off of the headlamp 12 is switched. In addition, in the embodiment, the headlamp on/off changeover switch 90 and the optical-axis-changeover switch 80 are each composed of a same shaped seesaw-type switch.

Figure 7:
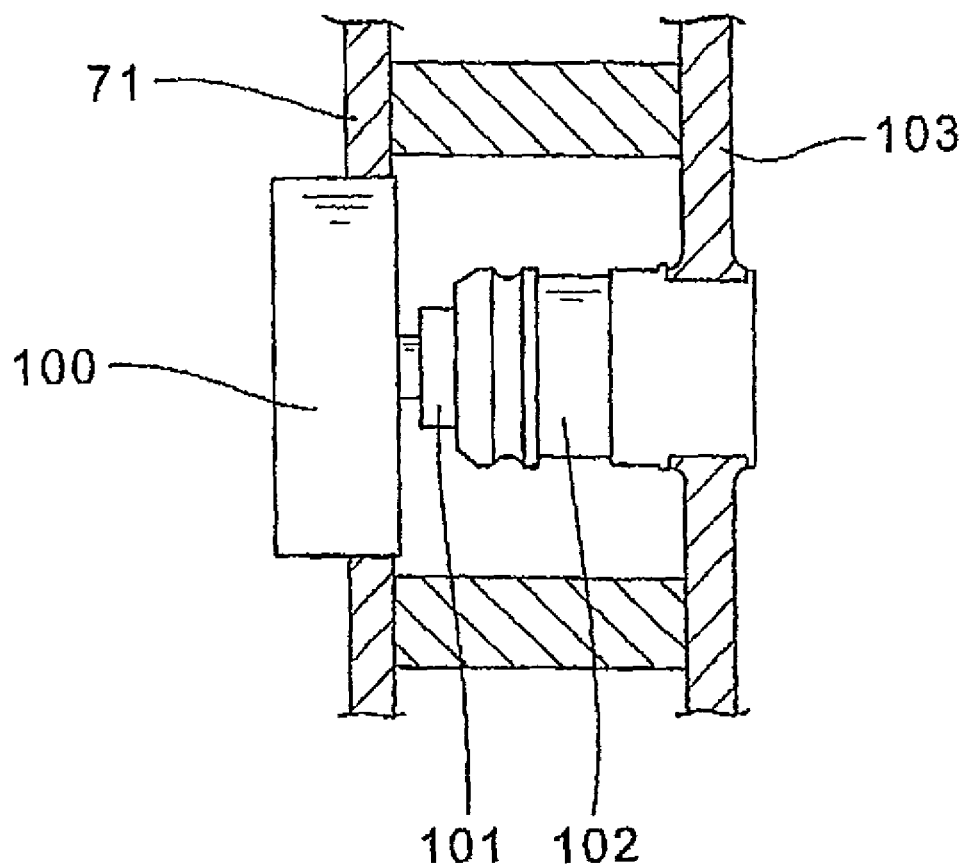
FIG. 7 is a cross-sectional view illustrating a structure of a starter switch.

FIG. 7 is a cross-sectional view illustrating a structure of the starter switch 100. The operating element of the starter switch 100 is supported by a slide shaft 101 held by a switch body 102 so as to be able to project and sink. A holding case 103 supporting the switch body 102 is secured to the operation board 71. The starter switch 100 is configured such that the starter motor is energized by bringing the contacts into contact with each other only while the starter switch is pressed. In addition, if the pressing force is cancelled, the starter switch 100 is returned to its initial position. The present embodiment employs a push-type to give an operative feeling of engine start-up to a driver. However, the starter switch may be made to be of a seesaw-type and the other switches a push-type.

In accordance with the vehicle switch arrangement structure of the present invention, as described above, the headlamp switches and the starter switch 100 are housed in the switch box. Therefore, even if all the switches are attached to the vehicle body panel, the main switch operated first to drive can easily be differentiated from the other switches. In addition, since the switch box and the main switch are arranged on the vehicle body panel, all the switches are centrally arranged in the vicinity of the steering wheel, which can enhance the operability of each of the switches. Since the switch box and the main switch are attached to the instrument panel, a fingertip can be prevented from coming into contact with the switches during operation of the steering wheel. Further, the lamp switch is made to be a seesaw-type switch and the starter switch is made to be a push-type switch. Therefore, even if the switch box cannot be viewed, both the switches can be differentiated from each other based on tactile sensation so as to allow for proper operation.

In addition, the structure and arrangement of the switch box and the main switch, the structure and shape of the instrument panel, the shape and arrangement of the steering wheel and the steering wheel column, the shape and arrangement of the headlamp on/off-changeover switch and the headlamp optical-axis-changeover switch, the shape and arrangement of the switches, etc., are not limited to the embodiment described above but can be modified in various ways. For example, the switch box and the main switch may be installed so as to be spaced apart from each other on the left and right of the steering wheel. The lamp switches may include an auxiliary lamp on/off switch. The vehicle switches according to the present invention can be applied not only to a four-wheeled vehicle but to various vehicles such as two-wheeled vehicles, three-wheeled vehicles, etc.

Figure 8:
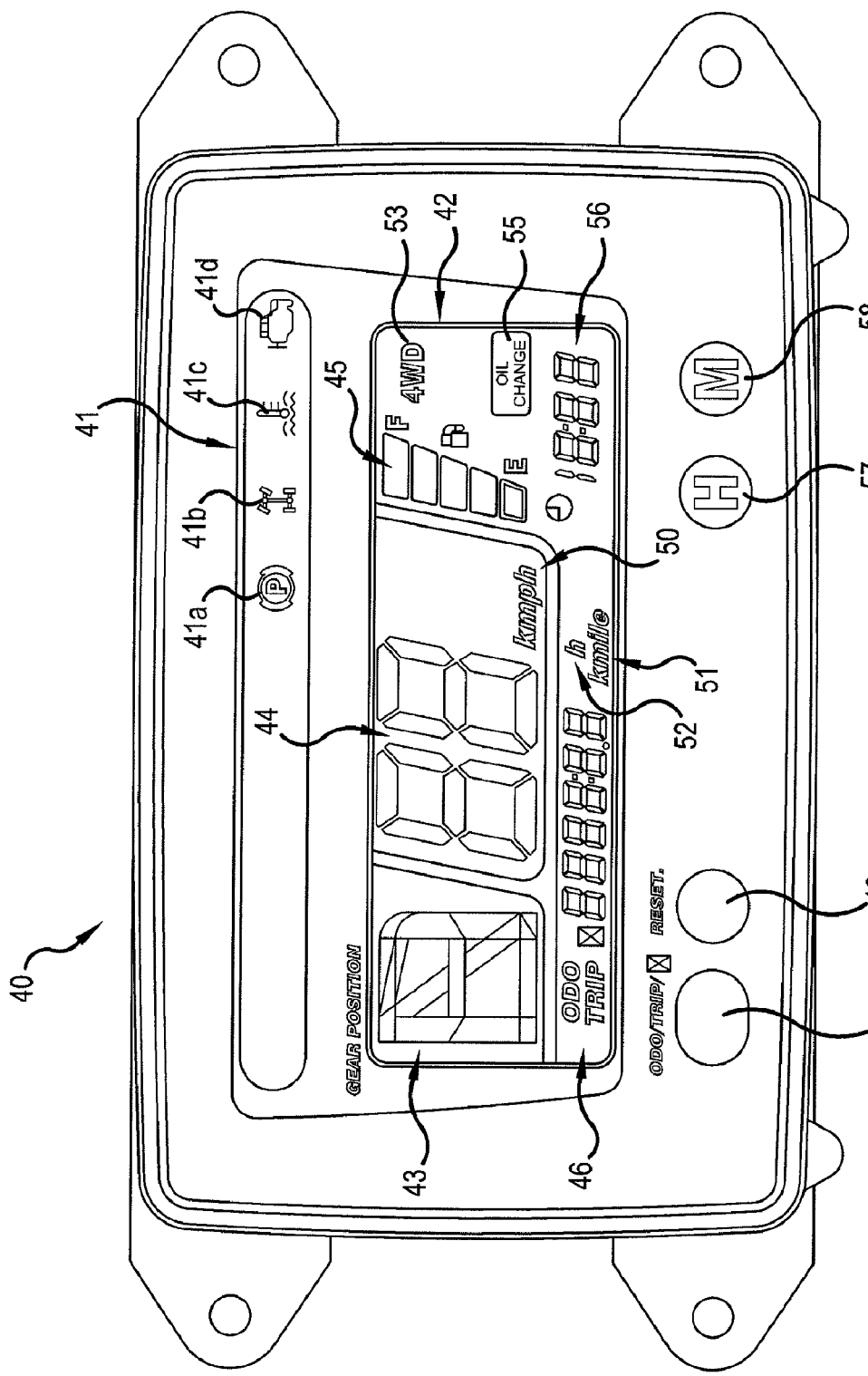
FIG. 8 is a front view of a meter device.

FIG. 8 is a front view of the meter device 40. The meter device 40 is such that a warning lamp indication frame 41 arranged with various warning lamps and the like is disposed in an upper stage, a segment display 42 provided with a speed meter, a travel distance meter and the like is disposed in a middle stage and an operational button group is disposed in a lower stage.

Starting from the left, a parking brake operation lamp 41a, a differential locking operation lamp 41b, a water temperature warning lamp 41c, and a fuel injector warning lamp 41d are arranged in the warning lamp indication frame 41. Such lamps are each configured to allow a light-emitting source such as an LED or the like to emit light in red, yellow or other colors.

The segment display 42 of the present embodiment is composed of liquid crystal elements. A two-digit speed meter 44 using seven-segment display is disposed at the general center of the segment display 42. A gear position indicator 43 for indicating a shift position of a transmission is disposed on the left of the speed meter 44. A fuel indicator 45, a 4-WD indicator 53 illuminated during four-wheel drive, an oil change time indicator 55 and a time indicator 56 using a seven-segment display are disposed on the right of the speed meter 44. A time-setting button 57 and a minute-setting button 58 are disposed below the time indication.

A multi-meter 46 having a function of an odo/trip meter and of a timer is disposed below the gear position indicator 43 and the speed meter 44. The multi-meter 46 is configured such that every time a function switching button 47 is pressed, switching is done as below: an odometer (an integrated distance meter)→a trip meter (block distance meter)→the timer. A reset button 48 has a function of returning a previous integrated value to zero by being operated during the display of the trip meter or the timer.

The meter device 40 according to the present embodiment is shared by destinations applied with kilometer indication (km, km/h) and with mile indication (mile, mph). To that end, a speed-unit indicator 50 disposed at the lower right of the numerals of the speed meter 44 is configured to indicate both "km/h" and "mph." The selection between the kilometer indication and the mile indication is done by use of inputting means inoperable by a user before shipment from a factory. The speed-unit indication means 50 according to the present embodiment is configured to indicate only one of "km/h" and "mph" depending on the selection between the kilometer indication and mile indication by means of the input means. In addition, the two-digit numerals indicated on the speed meter 44 are indicated to correspond to the selection between the kilometer indication and the mile indication.

A time-unit indication means 52 and a distance-unit indication means 51 are arranged one above the other on the right of the numerals of the multi-meter 46. The time-unit indication means 52 indicates a letter "h" when the multi-meter 46 produces the timer indication. On the other hand, the distance-unit indication means 51 is displayed when the multi-meter 46 displays the odometer or trip meter. The distance-unit indication means 51 is configured to be able to indicate both of "km" and "mile," and specifically to indicate only one of "km" and "mile" depending on the selection between kilometer-indication and mile-indication.

Figure 9:
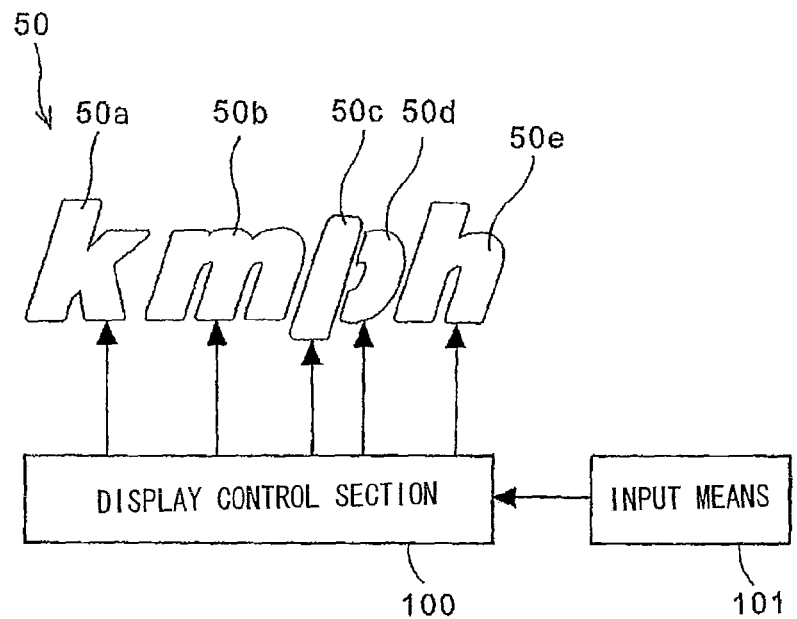
FIG. 9 is a block diagram illustrating a configuration of a speed-unit indicator.

FIG. 9 is a block diagram illustrating a configuration of the speed-unit indication means 50. The speed-unit indication means 50 consists of five display elements (50a, 50b, 50c, 50d and 50e) capable of being displayed independently of each other. The five display elements are arranged in a horizontal row. The visible outline of each letter indicates a display range of each display element and cannot visually be identified by a driver or the like in a non-display state. The display elements are each switched between the display state and non-display state in response to a display signal from a display control section 100 installed in the meter device 40 or the like. Which one of "km/h" and "mph" is displayed by the speed-unit indication means 50 is determined before the shipment of the vehicle by operating input means composed of a check coupler or the like. In short, the switching is not carried out by the driver or the like.

A first display element 50a is shaped in a letter "k." A second display element 50b shaped in a letter "m" is disposed right next to the first display element 50a. A third display element 50c shaped in a straight line slightly tilted rightward is disposed right next to the second display element 50b. A fourth arcuate display element 50 is disposed right next to the third display element 50c so as to have an opening facing the third display element 50c. The third and fourth display elements 50c and 50d are disposed adjacently to each other with a slight gap therebetween and are configured so that the shape of a letter "p" is visually recognized when both are simultaneously displayed. A fifth display element 50e in the shape of a letter "h" is disposed right next to the fourth display element 50d.

Figure 10:
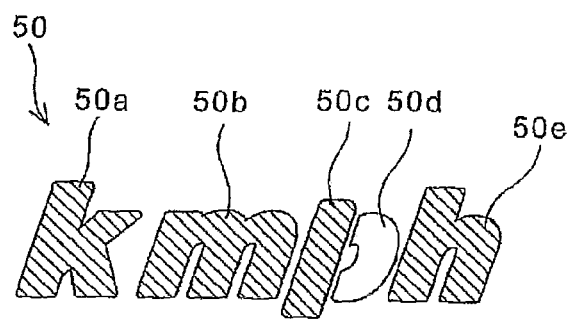
FIG. 10 is an operation-explanatory view of the speed-unit indicator encountered when kilometer indication is done.

FIG. 10 is an operational-explanatory view of the speed-unit indication means 50 encountered when kilometer indication is done. If the kilometer indication is selected by the input means 101, the display control section 100 displays the first display element 50a, the second display element 50b, the third display element 50c and the fifth display element 50e. Thus, a viewer can recognize the indication of the speed-unit indication means 50 to be "km/h."

Figure 11:
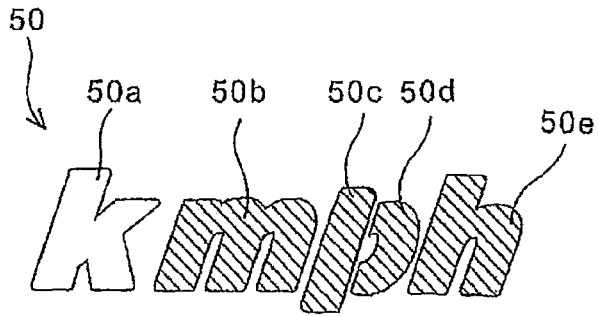
FIG. 11 is an operation-explanatory view of the speed-unit indicator encountered when mile indication is done.

FIG. 11 is an operational-explanatory view of the speed-unit indication means 50 encountered when mile indication is performed. If the mile indication is selected, the display control section 100 displays the second display element 50b, the third display element 50c, the fourth display element 50d and the fifth display element 50e. Thus, a viewer can recognize the indication of the speed-unit indication means 50 to be "mph."

In the speed-unit indication means 50 according to the present embodiment, the second display element 50b displaying "m," the third display element 50c displaying "/ (slash)" and the fifth display element 50e displaying "h" are common display elements constantly repeatedly displayed in any of the kilometer indication and mile indication. Thus, the occupancy area of the speed-unit indication means 50 can be reduced and the segment display 42 and meter device 40 can be reduced in size and simplified in structure. In addition, the speed-unit indication means 50 is such that the display part is not shifted up and down along with the switching of the unit indications and has a small amount shifted in a horizontal direction. This can reduce a sense of arrangement discomfort resulting from the indication switching.

Figure 12:
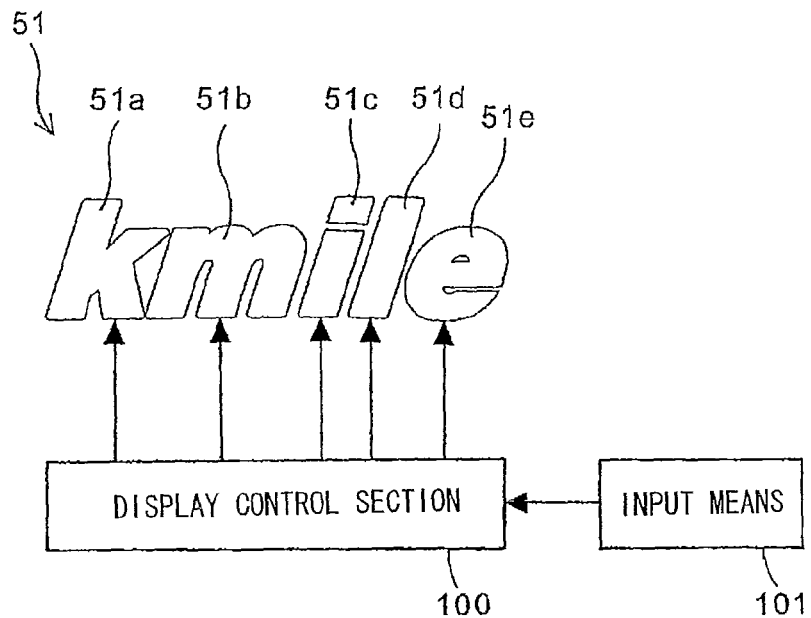
FIG. 12 is a block diagram illustrating a configuration of a distance-unit indication means.

FIG. 12 is a block diagram illustrating a configuration of the distance-unit indication means 51. The distance-unit indication means 51 is configured similarly to the speed-unit indication means 50, that is, is composed of five display elements (51a, 51b, 51c, 51d, 51e) capable of being displayed independently of each other. The display elements are each switched between the display state and non-display state in response to a display signal from the display control section 100 to indicate any one of "km" and "mile" on the distance-unit indication means 51.

A first display element 51a is in the shape of a letter "m." A second display element 51b, in a shape of a letter "k," is disposed right next to the first display element 51a. A third display element 51c, in a shape of a letter "i," is disposed right next to the second display element 50b. A fourth display element 51d, in a shape of a letter "l," is disposed right next to the third display element 51c. A fifth display element 51e, in a shape of a letter "e," is disposed right next to the fourth display element 51d.

Figure 13:
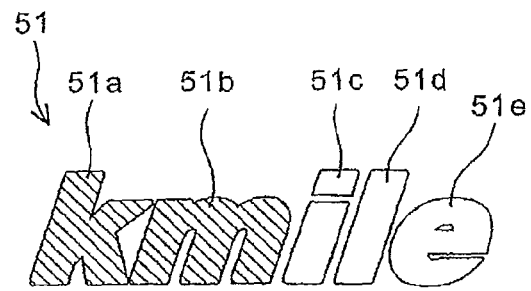
FIG. 13 is an operation-explanatory view of the distance-unit indication means encountered when kilometer indication is done.

FIG. 13 is an operational-explanatory view of the distance-unit indication means 51 encountered when kilometer indication is done. If the kilometer indication is selected by the input means 101, the display control section 100 displays only the first display element 51a and the second display element 50b. Thus, a viewer can recognize the indication of the distance-unit indication means 51 to be "km."

Figure 14:
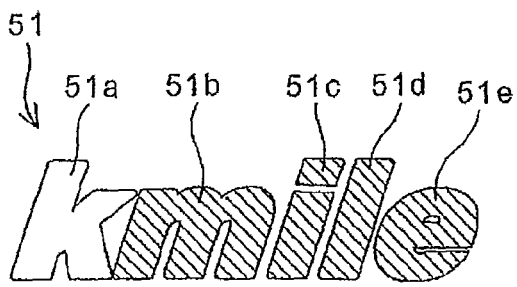
FIG. 14 is an operation-explanatory view of the distance-unit indication means encountered when mile indication is done.

FIG. 14 is an operation-explanatory view of the distance-unit indication means 51 encountered when mile indication is done. If the mile indication is selected, the display control section 100 displays only the second display element 51b, the third display element 51c, the fourth display element 51d and the fifth display element 51e. Thus, the viewer can recognize the indication of the distance-unit indication means 51 to be "mile."

In the speed-unit indication means 50 according to the present embodiment, the second display element 50b displaying a letter "m" is a common display element constantly repeatedly displayed in both the kilometer indication and mile indication. Thus, the occupancy area of the distance-unit indication means 50 can be reduced. In addition, the display part is not shifted up and down along with the switching of the unit indications and has a small amount shifted in a horizontal direction. This can reduce a sense of arrangement discomfort resulting from the indication switching.

In accordance with the meter device of the present invention as described above, the unit indication means for switchably displaying one of or the other of units by displaying an arbitrary display element of a plurality of display elements arranged adjacently to each other in a horizontal direction is such that the display elements are arranged to include a common display element repeatedly displayed even if any of one of or the other of units is displayed. Thus, the occupancy area of the unit indication means can be reduced so that the meter device can be reduced in size and simplified in structure.

In addition, the shapes and arrangements of the display elements in the speed-unit indication means and the distance-unit indication means, the configuration of the input means and the others are not limited to the embodiment described above but can be modified in various ways. For example, the segment display according to the present embodiment is composed of the liquid crystal display. However, the segment display 42 can be composed by use of LEDs (light-emitting diodes). The meter device according to the present invention can be applied to various vehicles such as three-wheeled vehicles, four-wheeled vehicles and the others as well as the motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle switch arrangement structure applied to a vehicle including a vehicle body panel, the vehicle body panel being composed of a steering wheel column covering a steering shaft of a steering wheel and an instrument panel on which the steering wheel column is installed to be erected upright, in which a starter switch adapted to start an engine by being operated when a main electric source of the vehicle is turned on, and a main switch adapted to changeover on/off of the main electric source of the vehicle in cooperation with a portable key are arranged on the vehicle body panel, the vehicle switch arrangement structure comprising:
   first and second lamp switches adapted to switch an operating state of a lamp; and
   a switch box having an operation board and the first and second lamp switches and the starter switch arranged one above another on the operation board;
   wherein the switch box is independent of the main switch and is disposed on the vehicle body panel in the vicinity of the main switch.

2. The vehicle switch arrangement structure according to claim 1, wherein the switch box is arranged on the instrument panel above the main switch.

3. The vehicle switch arrangement structure according to claim 1, wherein the switch box is substantially rectangular in shape and is disposed to partially or fully fit in a projective area of the steering wheel in a driver's eyesight.

4. The vehicle switch arrangement structure according to claim 1, wherein the switch box is substantially rectangular in shape, and in the box, the second lamp switch is located vertically above the starter switch, and first lamp switch is located vertically above the second lamp switch.

5. The vehicle switch arrangement structure according to claim 1, wherein the lamp switches are shaped differently from the starter switch.

6. The vehicle switch arrangement structure according to claim 2, wherein the lamp switches are shaped differently from the starter switch.

7. The vehicle switch arrangement structure according to claim 4, wherein the lamp switches are shaped differently from the starter switch.

8. The vehicle switch arrangement structure according to claim 1, wherein the starter switch is composed of a push-type switch, and the lamp switches are seesaw-type switches which are arranged adjacent to each other to have respective longitudinal sides opposed to each other.

9. The vehicle switch arrangement structure according to claim 1, wherein the first lamp switch is composed of a headlamp optical-axis-changeover switch and the second lamp switch is a headlamp on/off-changeover switch, and an erecting member is provided to surround one of the headlamp optical-axis-changeover switch and the headlamp on/off-changeover switch.

10. The vehicle switch arrangement structure according to claim 1, wherein the switch box is configured such that the starter switch is disposed below the lamp switches, and
   the main switch is disposed adjacently to and below the switch box.

11. The vehicle switch arrangement structure according to claim 2, wherein the switch box is configured such that the starter switch is disposed below the lamp switches, and
   the main switch is disposed adjacently to and below the switch box.

12. The vehicle switch arrangement structure according to claim 3, wherein the switch box is configured such that the starter switch is disposed below the lamp switches, and
   the main switch is disposed adjacently to and below the switch box.

13. The vehicle switch arrangement structure according to claim 5, wherein the switch box is configured such that the starter switch is disposed below the lamp switches, and
   the main switch is disposed adjacently to and below the switch box.

14. The vehicle switch arrangement structure according to claim 8, wherein the switch box is configured such that the starter switch is disposed below the lamp switches, and
   the main switch is disposed adjacently to and below the switch box.

15. The vehicle switch arrangement structure according to claim 9, wherein the switch box is configured such that the starter switch is disposed below the lamp switches, and
   the main switch is disposed adjacently to and below the switch box.

16. The vehicle switch arrangement structure according to claim 1, wherein a fluorescent coating is applied to the lamp switches and the starter switch.

17. A vehicle switch arrangement structure according to claim 1, and further including a meter device comprising:
  unit indication means including a plurality of display elements each producing a display in a predetermined range, the unit indication means being adapted to be displayed as speed-unit indication means, or alternatively, as distance-unit indication means; and
  display control means for switchably displaying one of the speed-unit indication means and the distance-unit indication means or the other of the speed-unit indication means and the distance-unit indication means by displaying only an arbitrary display element of the plurality of display elements;
  wherein the plurality of display elements are arranged adjacent to each other in a horizontal direction; and
  the unit indication means includes at least one common display element repeatedly displayed regardless of which one of the speed-unit indication means and the distance-unit indication means is displayed.

18. A vehicle meter device comprising:
  speed-unit indication means including a plurality of display elements arranged adjacent to each other in a horizontal direction; and
  display control means for switchably displaying one or more of the display elements;
  wherein the speed-unit indication means includes at least one common display element repeatedly displayed,
  wherein the speed-unit indication means is disposed on a right of a numeral indication to indicate speed-unit;
  the vehicle meter device includes input means for performing selection between a kilometer indication and a mile indication;
  the speed-unit indication means includes a first display element visually recognized as a shape of a "k," a second indication means disposed right next to the first display element and visually recognized as a shape of a "m," a third display element disposed right next to the second indication element and visually recognized as a shape of a straight line, a fourth display element disposed right next to the third display element and visually recognized as a shape of a circular arc, and a fifth display element disposed right next to the fourth display element and visually recognized as a shape of a "h;"
  the third display element and the fourth display element are arranged to be visually recognized as a shape of a "p" when both are displayed simultaneously; and
  the display control section is configured to display the first display element, the second display element, the third display element and the fifth display element when the kilometer indication is selected based on a selection signal from the input means, and to display the second display element, the third display element and the fourth display element and the fifth display element when the mile indication is selected.

19. A vehicle meter device comprising:
  distance-unit indication means including a plurality of display elements arranged adjacent to each other in a horizontal direction; and
  display control means for switchably displaying one or more of the display elements;
  wherein the distance-unit indication means includes at least one common display element repeatedly displayed,
  wherein the distance-unit indication means is disposed on the on a right of a numeral indication to indicate a distance-unit;
  the meter device includes input means for performing selection between a kilometer indication and a mile indication;
  the distance-unit indication means includes a first display element visually recognized as a shape of a "k," a second display element disposed right next to the first display element and visually recognized as a shape of a "m," a third display element disposed right next to the second display element and visually recognized as a shape of an "i," a fourth display element disposed right next to the third display element and visually recognized as a shape of a "l," and a fifth display element disposed right next to the fourth display element and visually recognized as a shape of an "e;" and
  the display control section is configured to display the first display element and the second display element when the kilometer indication is selected based on a selection signal from the input means, and to display the second display element, the third display element and the fourth display element and the fifth display element when the mile indication is selected.

20. The vehicle meter device according to claim 19, wherein time-unit indication means is disposed above or below the distance-unit indication means and visually recognized as a shape of a "h," and the display control means is configured to switchably display the distance-unit indication means and the time-unit indication means.

* * * * *